3,053,624
PRODUCTION OF ORTHOPHOSPHATES OF CALCIUM
Nimrod Smit, Johannesburg, and Jacob J. Coetzee, Vereeniging, Union of South Africa, assignors to African Metals Corporation Limited, Johannesburg, Union of South Africa, a limited-liability company incorporated in the Union of South Africa
No Drawing. Filed May 8, 1959, Ser. No. 811,777
10 Claims. (Cl. 23—108)

The present invention relates to an improved process for the production of orthophosphates of calcium.

Its primary object is the provision of an improvement in the process for the production of orthophosphates of calcium by hydrolysis of calcium metaphosphates (often called in the industry and hereinafter referred to for the sake of brevity as "calcium metaphosphates") by the provision of a novel calcium metaphosphate more amenable to hydrolysis to orthophosphates than those hitherto known and a process for the production of the said novel calcium metaphosphate.

Other objects of the invention will become apparent from the following description.

Calcium metaphosphates are essential intermediate products in the production of orthophosphates of calcium from raw or beneficiated phosphate minerals, such as phosphate rock, apatite concentrates or the like.

Various processes of the said type are known.

A process of the said type for the production of monocalcium phosphates and dicalcium phosphates from raw phosphate rock and apatite concentrates produced in the Union of South Africa is described on pages 28–29 of "The South African Engineer," November 1956.

In this process the mixture of phosphate rock and apatite concentrates is reduced with coke in a totally enclosed circular electric furnace using graphite electrodes to form gases bearing yellow phosphorus.

The said gases are burned with air in a burner chamber to phosphorus pentoxide as the essential product.

In a further stage the phosphorus pentoxide thus formed is allowed to stream upwards in a reaction tower countercurrent to a descending column of lump rock phosphate and apatite concentrates, at a suitably elevated temperature of e.g. between 1,000° and 1,200° C. Molten condensed phosphates of calcium are thereby formed and practically all inherent fluorine is volatilised.

The calcium metaphosphate form the starting material for the production of orthophosphates of calcium by hydrolysis e.g. with hot water.

It has been observed that the rate of reaction in the production of orthophosphates of calcium by hydrolysis of calcium metaphosphate produced in various processes is liable to be too slow for economic operation.

We have now found that the rate of the production of orthophosphates of calcium by hydrolysis of calcium metaphosphate is greatly enhanced if provision is made for the presence in the calcium metaphosphate to be subjected to hydrolysis of 2–15% by weight, preferably 7–13% and optimally about 12.5% by weight, of $SiO_2$ and $P_2O_5:CaO$ in a molar ratio of 0.96–1.2 and preferably 1–1.1 and $SiO_2:CaO$ in a molar ratio of 0.27–0.53 and optimally 0.15–0.38 and/or of $SiO_2:P_2O_5$ in a molar ratio of 0.1–0.7, preferably 0.4–0.5, and optimally about 0.5.

Preferably, provision should be made for the adjustment of all the said proportions in the initial material.

The maintenance of the said proportions may be controlled by:

(a) The temperature of the reaction between the products of combustion of phosphorus and the phosphate rock.

(b) The chemical composition of the material charged.

As required, the $SiO_2$ and $CaO$ contents can be adjusted by the addition of sand or quartz or lower grade phosphate ore or in the case of $CaO$ adjustment limestone or burnt lime may be added.

For instance, the content of $SiO_2$ may be adjusted according to the requirements in accordance with the present invention by suitable blending of the initial material. The same applies to the content of phosphorus pentoxide. In the process described above for the conversion of rock phosphates to metaphosphates, it has further been found that if the temperature in the burner chamber is increased much above 1,200° C. the content of $P_2O_5$ in the metaphosphate tends to decrease with the production of a calcium pyrophosphate content, as has been proved by X-ray examination. In this instance, the rate of hydrolysis of the calcium metaphosphate is also retarded.

The phosphate rock or other phosphate mineral to be brought into reaction with the products of combustion of phosphorus may be contained in a bed in a reaction tower and/or may be introduced into a burner chamber and/or into a reactor in the form of a fine powder, preferably 60–70 percent—200 mesh Tyler, or may be provided in any other suitable manner.

When in a sub-divided state the calcium metaphosphates should not be stored for long periods of time as it is usually hygroscopic and when it takes up water, the hydrolysis process to which they are to be subjected is retarded.

The hydrolysis of the metaphosphates having a composition in accordance with the present invention may, e.g. be carried out in the apparatus illustrated in the publication above-mentioned as shown by the following example, but the invention is not limited to the example given.

The calcium metaphosphates are ground in a dry state to a suitable degree of fineness, say, to 80% of 100 mesh and below.

One ton per hour of the ground metaphosphate is fed together with 80 gallons of water per hour at a temperature of 90° C. or more, preferably of about 94–96° C., into a worm conveyor mixer in which the material is mixed until gelling occurs. This is usually the case in about 3 minutes, in the course of which the temperature rises to about 100° C. or slightly higher. From the mixer the material is fed on to a slowly moving belt within a closed reaction space in which the temperature of the products rises in the course of about 40 minutes to one hour, say, about 45 minutes in an exothermic reaction up to about 140° C., steam passing off through a stack.

The monocalcium phosphate thus produced is passed out of the reactor to a disintegrator and may be bagged for use as such. On the other hand, 1.2 tons per hour of the monocalcium phosphate may be mixed with 750 lbs. per hour of lime and milled in a ball mill, in which the temperature rises in exothermic reaction to 80–90° C. to produce di-calcium phosphate. The heat evolved serves for drying the product.

Instead of the aforesaid continuous process, the hydrolysis of the calcium metaphosphate may be carried out as a batch operation. For example, and without limitation to the example given, in a batch operation 500 pounds of milled condensed phosphate is mixed by means of any suitable type of mixer with 26 gallons of boiling water and allowed to stand in any suitable container for about three-quarters of an hour to 2 hours until the reaction is complete. An advantage of the batch operation as against continuous operation is that the amount of water added can be reduced and thus a drier product can be directly obtained.

When using the process in accordance with the present invention for the conversion of calcium metaphosphate produced in the process in accordance with the aforesaid publication or by any other suitable process, the capacity of the hydrolysis plant is greatly increased and the production of mono- and/or dicalcium phosphates is rendered more economic.

Ammoniated calcium orthophosphates such as are used as fertilisers can be produced by treating the orthophosphates produced in accordance with the invention with ammoniating agents such as anhydrous ammonia, ammonium hyroxide solution, ammonium nitrate-anhydrous ammonia solutions, urea-ammonium hydroxide solutions or urea formaldehyde-ammonium hydroxide solutions. The same type of ammoniated mixed fertilizers can also be produced in accordance with the invention by adding the ammoniating agent before or during the process of hydrolysis.

The orthophosphates and ammoniated orthophosphates which are produced in accordance with the invention have remarkably good granulating properties.

We claim:

1. An improved process for the production of a calcium orthophosphate which comprises preparing a calcium metaphosphate containing between 2 and 15 percent by weight of $SiO_2$ and further containing $P_2O_5:CaO$ in a molar ratio between 0.96 and 1.2 and further containing $SiO_2:CaO$ in a molar ratio between 0.27 and 0.53, and hydrolysing the said calcium metaphosphate to calcium orthophosphate.

2. An improved process for the production of a calcium orthophosphate as claimed in claim 1 in which the calcium metaphosphate prepared and to be subjected to hydrolysis further contains $SiO_2:P_2O_5$ in a molar ratio of between 0.1 and 0.7.

3. An improved process for the production of a calcium orthophosphate which comprises preparing a calcium metaphosphate containing between 7 and 13 percent by weight of $SiO_2$ and further containing $P_2O_5:CaO$ in a molar ratio between 1 and 1.1, $SiO_2:CaO$ in a molar ratio between 0.15 and 0.38 and $SiO_2:P_2O_5$ in a molar ratio between 0.4 and 0.5 and hydrolysing the said calcium metaphosphate to calcium orthophosphate by treatment with hot water.

4. A process as claimed in claim 3 in which the hydrolysis is carried out at temperatures between about 90 and 140° C. and is completed within two hours.

5. An improved process for the production of a calcium orthophosphate which comprises preparing a calcium metaphosphate containing between 7 and 13 percent by weight of $SiO_2$ and further containing $P_2O_5:CaO$ in a molar ratio between 1 and 1.1, $SiO_2:CaO$ in a molar ratio between 0.15 and 0.38 and $SiO_2:P_2O_5$ in a molar ratio between 0.4 and 0.5 and hydrolysing the said calcium metaphosphate to calcium orthophosphate by comminuting the calcium metaphosphate and subjecting it to a mixing operation with water at a temperature of at least 90° C. until gelling occurs, thence maintaining the mixture thus obtained in a reaction space for about 40 minutes to one hour during which a rise in temperature occurs due to the exothermic reaction up to about 140° C.

6. An improved process for the production of a calcium orthophosphate which comprises preparing a calcium metaphosphate containing between 7 and 13 percent by weight of $SiO_2$ and further containing $P_2O_5:CaO$ in a molar ratio between 1 and 1.1, $SiO_2:CaO$ in a molar ratio between 0.15 and 0.38 and $SiO_2:P_2O_5$ in a molar ratio between 0.4 and 0.5 and hydrolysing the said calcium metaphosphate to calcium orthophosphate by mixing the said calcium metaphosphate in a comminuted state with approximately half its amount by weight of water approximately at boiling point and allowing the reaction mixture to stand for about three-quarters of an hour to 2 hours until the hydrolysis is complete.

7. An improved process for the production of an ammoniated calcium orthophosphate which comprises preparing a calcium metaphosphate containing between 2 and 15 percent by weight of $SiO_2$ and further containing $P_2O_5:CaO$ in a molar ratio between 0.96 and 1.2 and further containing $SiO_2:CaO$ in a molar ratio between 0.27 and 0.53, and hydrolysing the said calcium metaphosphate to ammoniated calcium orthophosphate with an ammoniated aqueous hydrolysing medium.

8. An improved process for the production of an ammoniated calcium orthophosphate which comprises preparing a calcium metaphopshate containing between 2 and 15 percent by weight of $SiO_2$ and further containing $P_2O_5:CaO$ in a molar ratio between 0.96 and 1.2 and further containing $SiO_2:CaO$ in a molar ratio between 0.27 and 0.53, and hydrolysing the said calcium metaphosphate to calcium orthophosphate and ammoniating the latter.

9. A condensed phosphate of calcium prepared by reacting a phosphate mineral with products of the combustion of phosphorus in the presence of silica-rich and lime-rich materials in proportions and at a high temperature not above about 1200° C. so adjusted that a melt is produced which condenses to a product, easily hydrolysable to a calcium orthophosphate by treatment with water near its normal boiling point and which contains between 2 and 15 percent by weight of $SiO_2$, $P_2O_5:CaO$ in a molar ratio of between 0.96 and 1.2 and $SiO_2:CaO$ in a molar ratio of 0.27–0.53.

10. A condensed phosphate of calcium as claimed in claim 9 which contains $SiO_2:P_2O_5$ in a molar ratio of 0.1–0.7

References Cited in the file of this patent

UNITED STATES PATENTS

| | | |
|---|---|---|
| 1,925,644 | Pristoupil | Sept. 5, 1933 |
| 2,064,979 | Kaselitz | Dec. 22, 1936 |
| 2,266,328 | McCullough | Dec. 16, 1941 |
| 2,288,418 | Partridge | June 30, 1942 |
| 2,837,418 | Seymour | June 3, 1958 |